US012574799B1

(12) United States Patent
Higman et al.

(10) Patent No.: US 12,574,799 B1
(45) Date of Patent: Mar. 10, 2026

(54) MANET RADIO WITH EXTENDED COMPUTATIONAL TOOLS AND CONNECTIONS

(71) Applicant: Serastar Technologies, Inc., Mesa, AZ (US)

(72) Inventors: Gary B. Higman, Mesa, AZ (US); Darren L Kessner, Phoenix, AZ (US)

(73) Assignee: Serastar Technologies, Inc., Mesa, AZ (US)

( * ) Notice: Subject to any disclaimer, the term of this patent is extended or adjusted under 35 U.S.C. 154(b) by 490 days.

(21) Appl. No.: 18/051,774

(22) Filed: Nov. 1, 2022

Related U.S. Application Data

(60) Provisional application No. 63/331,228, filed on Apr. 14, 2022.

(51) Int. Cl.
*H04W 40/12* (2009.01)
*H04W 28/06* (2009.01)
*H04W 28/08* (2023.01)

(52) U.S. Cl.
CPC ....... *H04W 28/0967* (2020.05); *H04W 28/06* (2013.01); *H04W 40/12* (2013.01)

(58) Field of Classification Search
CPC . H04W 28/0967; H04W 28/06; H04W 40/12; H04W 84/18
See application file for complete search history.

(56) References Cited

U.S. PATENT DOCUMENTS

| | | | | |
|---|---|---|---|---|
| 6,373,430 | B1* | 4/2002 | Beason | .............. H04B 7/18554 342/357.34 |
| 2004/0203797 | A1* | 10/2004 | Burr | ........................ H04L 67/10 455/445 |
| 2006/0092939 | A1* | 5/2006 | Duggi | .................. H04W 88/182 370/401 |
| 2021/0243072 | A1* | 8/2021 | Peterson | .............. G06F 11/2012 |

OTHER PUBLICATIONS

Miao et al. "Comparison studies of MANET-satellite and MANET-cellular networks integrations", IEEE , 2015 International Conference on Wireless Communications & Signal Processing (WCSP) (Year: 2015).*

* cited by examiner

*Primary Examiner* — Ayaz R Sheikh
*Assistant Examiner* — Mang Boi Thawng
(74) *Attorney, Agent, or Firm* — Booth Udall, PLC; Kenneth C. Booth

(57) ABSTRACT

A mobile ad hoc network (MANET) radio system configured to send and receive data from a MANET network through multiple communication modes including an internal mode to communicate directly with the MANET network, a satellite mode to enable satellite communication and a cellular mode to enable cellular communication, and an external mode to exchange data with an external communication system. The MANET network includes many radio systems and each is configured to verify a connection with each other, and designate a selected radio system, determine an optimal communication path to the selected radio system. A communication path passes through an intermediate radio (Continued)

MANET radio system 100

Satellite modem 122

Cellular modem 124

MANET radio 114

Data port 134

Processor 106

MANET communication network 102

110 system, and communicates data to and from the selected radio system over the optimal communication path. The processor selects an optimal mode based on the strength and availability of each mode.

18 Claims, 4 Drawing Sheets

100

108

104

134

MANET RADIO WITH EXTENDED COMPUTATIONAL TOOLS AND CONNECTIONS

CROSS REFERENCE TO RELATED APPLICATIONS

This application claims the benefit of the filing date of U.S. Provisional Patent Application 63/331,228 entitled "MANET Radio with Extended Computational Tools and Connections" to Higman et al. that was filed on Apr. 14, 2022, the disclosure of which is hereby incorporated herein by this reference.

TECHNICAL FIELD

Aspects of this document relate generally to MANET radio systems, and more specifically to MANET radio systems with extended communication abilities.

BACKGROUND

Mobile ad hoc network (MANET) radios are used to communicate wirelessly. MANET radios don't require pre-existing infrastructure such as routers to function in a particular area. Instead, each MANET radio connects directly to the other MANET radios within direct line-of-sight. Additionally, each MANET radio "shares" its connection to all MANET radios within its line-of-sight with any connected MANET radios. This forms an interlocking web of connections between the radios within the network.

SUMMARY

Aspects of this document relate to a mobile ad hoc network (MANET) radio system comprising a body configured to house the MANET radio system, and a processor within the body configured to receive data from and transmit data to a MANET communication network through a plurality of communication modes comprising a first internal communication mode having a MANET radio housed within the body and configured to communicate directly with the MANET communication network, at least two additional internal communication modes including a satellite communication mode having a satellite modem housed within the body and configured to enable satellite communication with the MANET communication network and a cellular communication mode having a cellular modem housed within the body and configured to enable cellular communication with the MANET communication network, and an external communication mode having at least one data port configured to communicatively engage with a data cord to communicatively couple with an external communication system and enable the MANET radio system to receive and transmit data through a communication network of the external communication system, wherein the MANET communication network comprises a plurality of radio systems, wherein each radio system in the MANET communication network is configured to verify a connection with each other radio system of the plurality of radio systems in the MANET communication network at least 50 times per second, designate a selected radio system of the plurality of radio systems, determine an optimal communication path from a plurality of communication paths to the selected radio system through the MANET communication network, wherein at least one of the plurality of communication paths passes through at least one intermediate radio system of the plurality of radio systems, and receive data from and transmit data to the selected radio system of the plurality of radio systems over the optimal communication path, and wherein the processor is configured to select an optimal communication mode from the first internal communication mode, the at least two additional internal communication modes, and the external communication mode based on the strength and availability of each communication mode.

Particular embodiments may comprise one or more of the following features. The MANET radio system may be capable of maintaining a connection with the MANET communication network regardless of a location of the MANET radio system with respect to the MANET communication network. The at least two additional communication modes may include at least one of a Wi-Fi communication mode, a global positioning satellite (GPS) communication mode, an internet modem communication mode, a Bluetooth communication mode, and a voice over internet protocol (VOIP) communication mode. The body may have a touch-screen configured to provide controls to a user of the MANET radio system and display data received from the MANET communication network to the user. The MANET radio system may be configured to display a location of other MANET radio systems connected to the MANET communication network to the user. The MANET radio system may be configured to work with other MANET radio systems connected to the MANET communication network to jointly complete a task. The task may be one of solving a computational problem, analyzing data, and breaking an encryption code.

Aspects of the disclosure relate to a mobile ad hoc network (MANET) radio system comprising a body configured to house the MANET radio system, and a processor within the body configured to receive data from and transmit data to a MANET communication network through a plurality of communication modes comprising a first internal communication mode having a MANET radio housed within the body and configured to communicate directly with the MANET communication network, and at least one additional internal communication mode including at least one of a satellite communication mode having a satellite modem housed within the body and configured to enable satellite communication with the MANET communication network and a cellular communication mode having a cellular modem housed within the body and configured to enable cellular communication with the MANET communication network, wherein the MANET communication network comprises a plurality of radio systems, wherein each radio system in the MANET communication network is configured to designate a selected radio system of the plurality of radio systems, determine an optimal communication path from a plurality of communication paths to the selected radio system through the MANET communication network, wherein at least one of the plurality of communication paths passes through at least one intermediate radio system of the plurality of radio systems, and receive data from and transmit data to the selected radio system of the plurality of radio systems over the optimal communication path, and wherein the processor is configured to select an optimal communication mode from the first internal communication mode and the at least one additional internal communication mode based on the strength and availability of each communication mode.

Particular embodiments may comprise one or more of the following features. An external communication mode having at least one data port configured to communicatively engage with a data cord to communicatively couple with an external communication system and enable the MANET radio system to receive and transmit data through a communication network of the external communication system, wherein the processor is configured to select an optimal communication mode from the first internal communication mode, the at least one additional internal communication mode, and the external communication mode. Each radio system in the MANET communication network may be configured to verify a connection with each other radio system of the plurality of radio systems in the MANET communication network at least 50 times per second. The MANET radio system may be configured to work with other MANET radio systems connected to the MANET communication network to jointly complete a task. The task may be one of solving a computational problem, analyzing data, and breaking an encryption code.

Aspects of this disclosure relate to a mobile ad hoc network (MANET) radio system comprising a body configured to house the MANET radio system, and a processor within the body configured to receive data from and transmit data to a MANET communication network through a plurality of communication modes comprising a first internal communication mode having a MANET radio housed within the body and configured to communicate directly with the MANET communication network, and at least one additional internal communication mode configured to enable at least one of satellite communication and cellular communication with the MANET communication network, wherein the MANET communication network comprises a plurality of radio system, wherein each radio system in the MANET communication network is configured to designate a selected radio system of the plurality of radio systems, determine an optimal communication path from a plurality of communication paths to the selected radio system through the MANET communication network, wherein at least one of the plurality of communication paths passes through at least one intermediate radio system of the plurality of radio systems, and receive data from and transmit data to the selected radio system of the plurality of radio systems over the optimal communication path, and wherein the processor is configured to select an optimal communication mode from the first internal communication mode and the at least one additional internal communication mode based on the strength and availability of each communication mode.

Particular embodiments may comprise one or more of the following features. The at least one additional internal communication mode may include a satellite communication mode having a satellite modem housed within the body and configured to enable satellite communication with the MANET communication network. The at least one additional internal communication mode may include a cellular communication mode having a cellular modem housed within the body and configured to enable cellular communication with the MANET communication network. The plurality of communication modes may further comprise an external communication mode having at least one data port configured to communicatively engage with a data cord to communicatively couple with an external communication system and enable the MANET radio system to receive and transmit data through a communication network of the external communication system, wherein the processor is configured to select an optimal communication mode from the first internal communication mode, the at least one additional internal communication mode, and the external communication mode. The body may have a touchscreen configured to provide controls to a user of the MANET radio system and display data received from the MANET communication network to the user. Each radio system in the MANET communication network may be configured to verify a connection with each other radio system of the plurality of radio systems in the MANET communication network at least 50 times per second. The MANET radio system may be configured to work with other MANET radio systems connected to the MANET communication network to jointly complete a task. The task may be one of solving a computational problem, analyzing data, and breaking an encryption code.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . ," or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
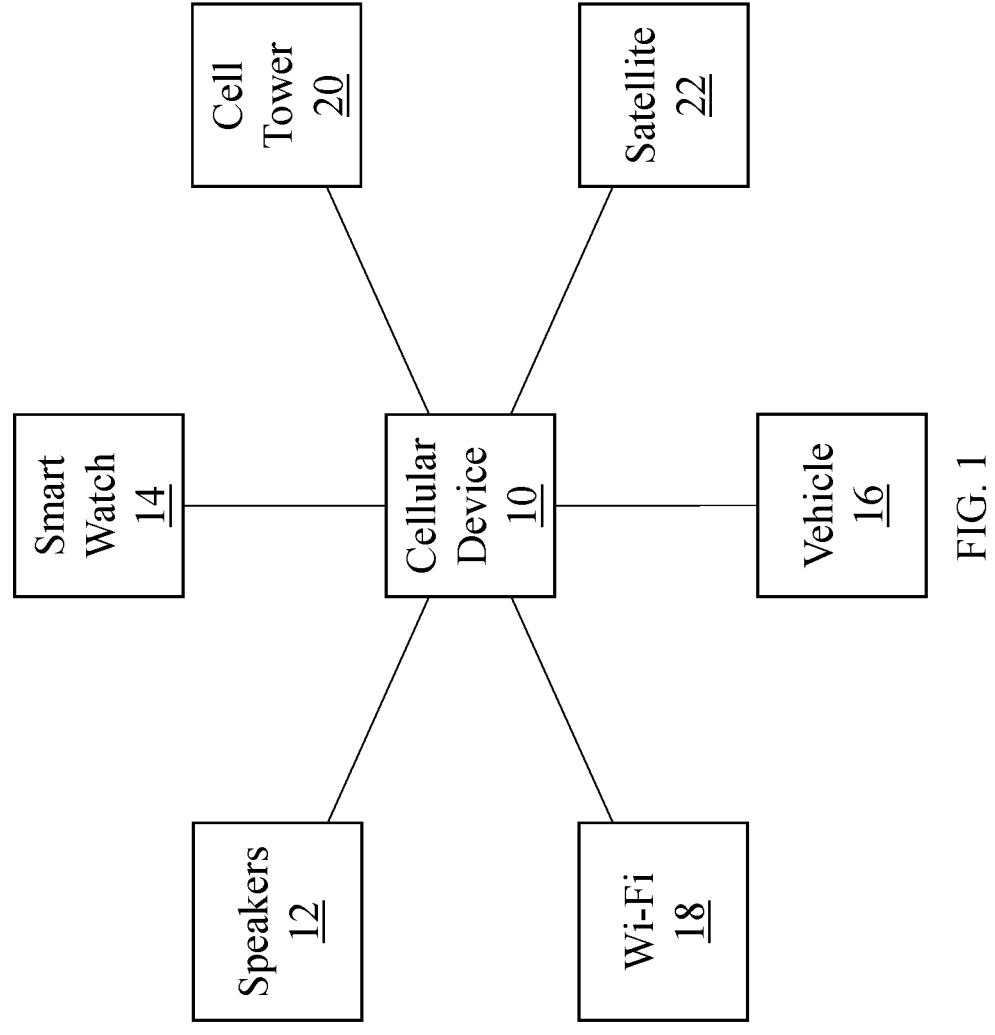
FIG. 1 is a schematic view of a prior art communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure is related to a mobile ad hoc network (MANET) radio system 100. The MANET radio system 100 is a radio that is configured to maintain a connection with a MANET communication network 102 and enable the transmission and receipt of data into and out of the MANET communication network 102. The MANET radio system 100 may be a traditional physical radio device, or may be embodied in a device with a software-defined radio. Traditionally, MANET radio networks allow for communication between individual radios within the MANET radio network, but do not enable any sort of communication outside of the radios within the MANET radio network. This limits the usefulness of MANET radio networks because MANET radio networks rely on line-of-sight communication between the individual radios. For example, once an individual radio loses sight of all other radios within the MANET radio network, this radio is excluded from the MANET radio network and loses connectivity. As another example, if a first portion of the radios in the MANET radio network all lose sight of any of the radios in a second portion of the radios in the MANET radio network, the first portion of radios and the second portion of radios are effectively split into two separate MANET radio networks.

As discussed herein, a MANET radio system 100 and a MANET communication network 102 specifically apply to systems and networks which function by constantly looking for other radios within sight of the MANET radio system 100. The MANET radio system 100 may look for other radios at a specified rate per second, such as 100 times per second. Other rates may also be implemented. Because the MANET radio system 100 is constantly looking for the other radios, each MANET radio system 100 within the MANET communication network 102 constantly updates information regarding which radios are within line of sight. Additionally, each MANET radio system 100 communicates information regarding the radios to which the MANET radio system 100 is connected to other connected radios. For example, in a situation where radio A is connected to radio B, but not to radio C because radio C is out of sight, but radio B is connected to both radio A and radio C, radio A may receive information regarding the location and connectivity of radio C through radio B. Any number of intermediate radios may be used. In this way, the MANET communication network 102 is a mesh or web of constantly connected devices. Each MANET radio system 100 has the ability to route signals, data, and information through intermediate radios or devices to reach a target device. Thus, any device connected to the MANET communication network 102 can be reached by any other device connected to the MANET communication network 102, even if the sending device and the target device are separated by some barrier or a large distance and are not in line of sight of each other.

Figure 2:
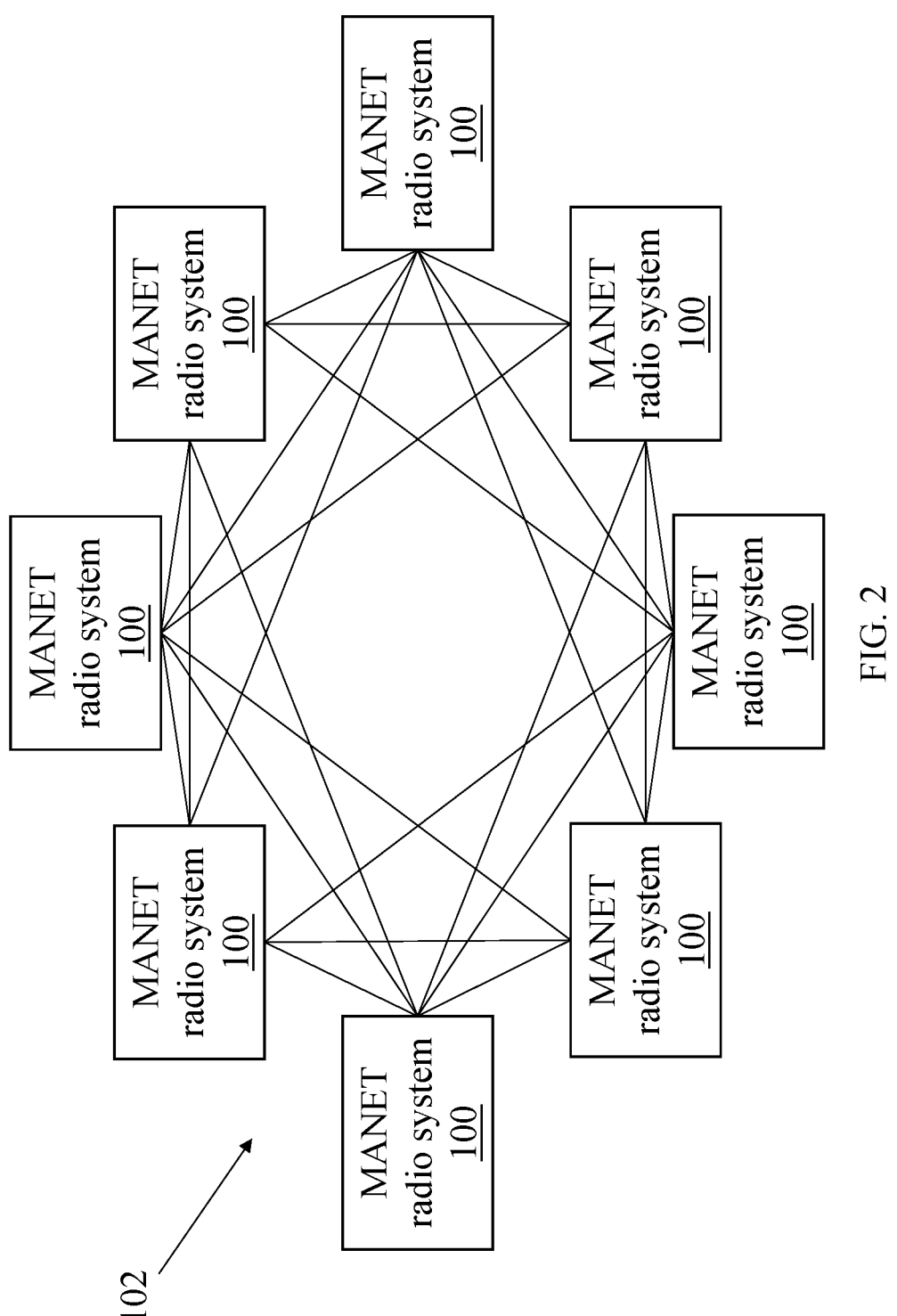
FIG. 2 is a schematic view of a MANET communication network with a plurality of MANET radio systems.

An important distinction between the MANET radio system 100 and traditional communication devices is the ability of the MANET radio system 100 to route data and information through intermediate radio systems to reach the target radio system. As shown in FIG. 1, a traditional communication device 10, such as a cellular device, may be configured to communicatively couple with multiple peripheral devices. For example, a cellular device 10 may be configured to couple with devices such as speakers 12, a smart watch 14, or a vehicle 16 through a Bluetooth connection, in addition to connecting to Wi-Fi 18, a cell tower 20, and/or a satellite 22. The cellular device 10 acts as the hub for the communicative function of the network shown. Thus, any communication coming in arrives at the cellular device 10 with the cellular device 10 being the target device, though the cellular device 10 may subsequently send the data or information on to another peripheral device. On the other hand, the MANET radio system 100 is communicatively coupled with each of the other radios in the MANET communication network 102, and each MANET radio system 100 can act as an intermediate radio system. Thus, as shown in FIG. 2, each MANET radio system 100 can communicate with any of the other MANET radio systems 100, even in cases where there is no direct connection, by sending the information or data through an intermediate radio system. Any of the communication lines may be broken at any time, but as long as the MANET radio system 100 is connected to at least one other radio and that radio is connected to the MANET communication network 102, the MANET radio system 100 is capable of sending data to and receiving data from any of the other radios connected to the MANET communication network 102. Traditional communication devices are not capable of routing information and data in this same way, especially where each radio system 100 is configured to route its outgoing data to the target device.

Figure 3:
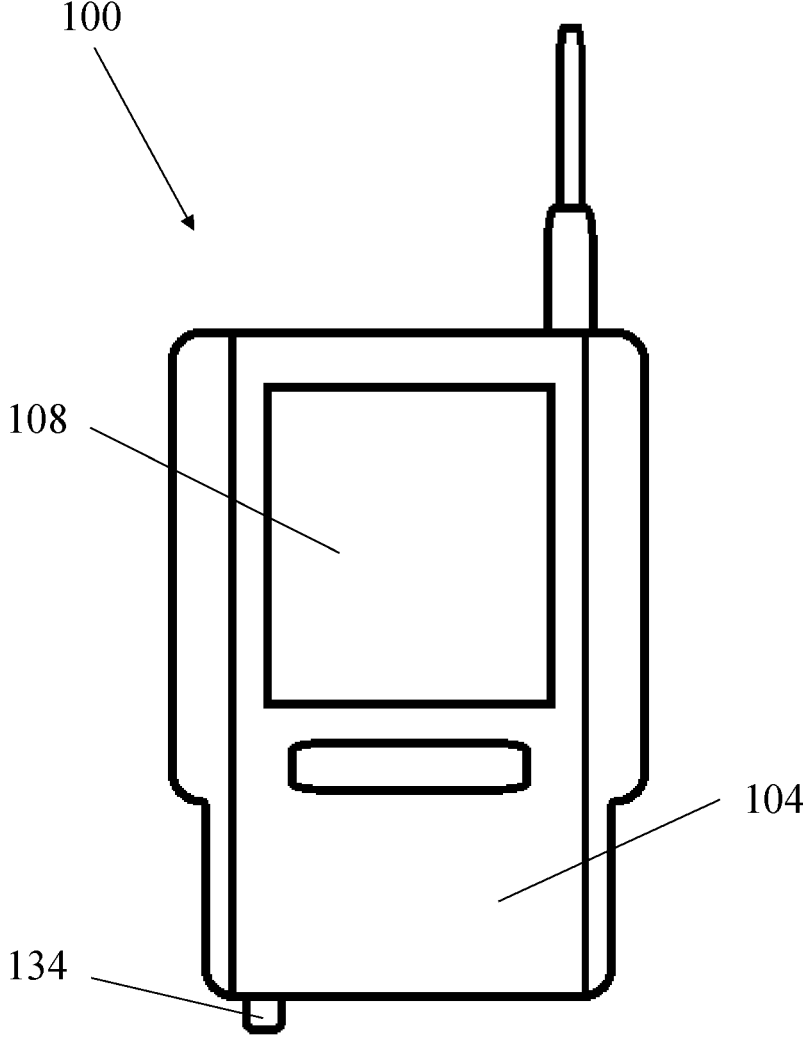
FIG. 3 is a perspective view of a MANET radio system.

The MANET radio system 100 comprises a body 104 and a processor 106. The body 104 is configured to house the MANET radio system 100, as shown in FIG. 3. The processor 106 is positioned within the body 104 and is configured to receive data from and transmit data to the MANET communication network 102. The body 104 may have a screen 108 configured to provide controls to a user of the MANET radio system 100 and/or display data received from the MANET communication network 102 to the user. For example, the screen 108 may be configured to display a location of other MANET radio systems 100 connected to the MANET communication network 102 to the user. The screen 108 may be a touchscreen as known in the art. The body 104 may be water resistant so that the MANET radio system 100 is water-tight submersible and continues to function when wet or submerged in water.

Figure 4:
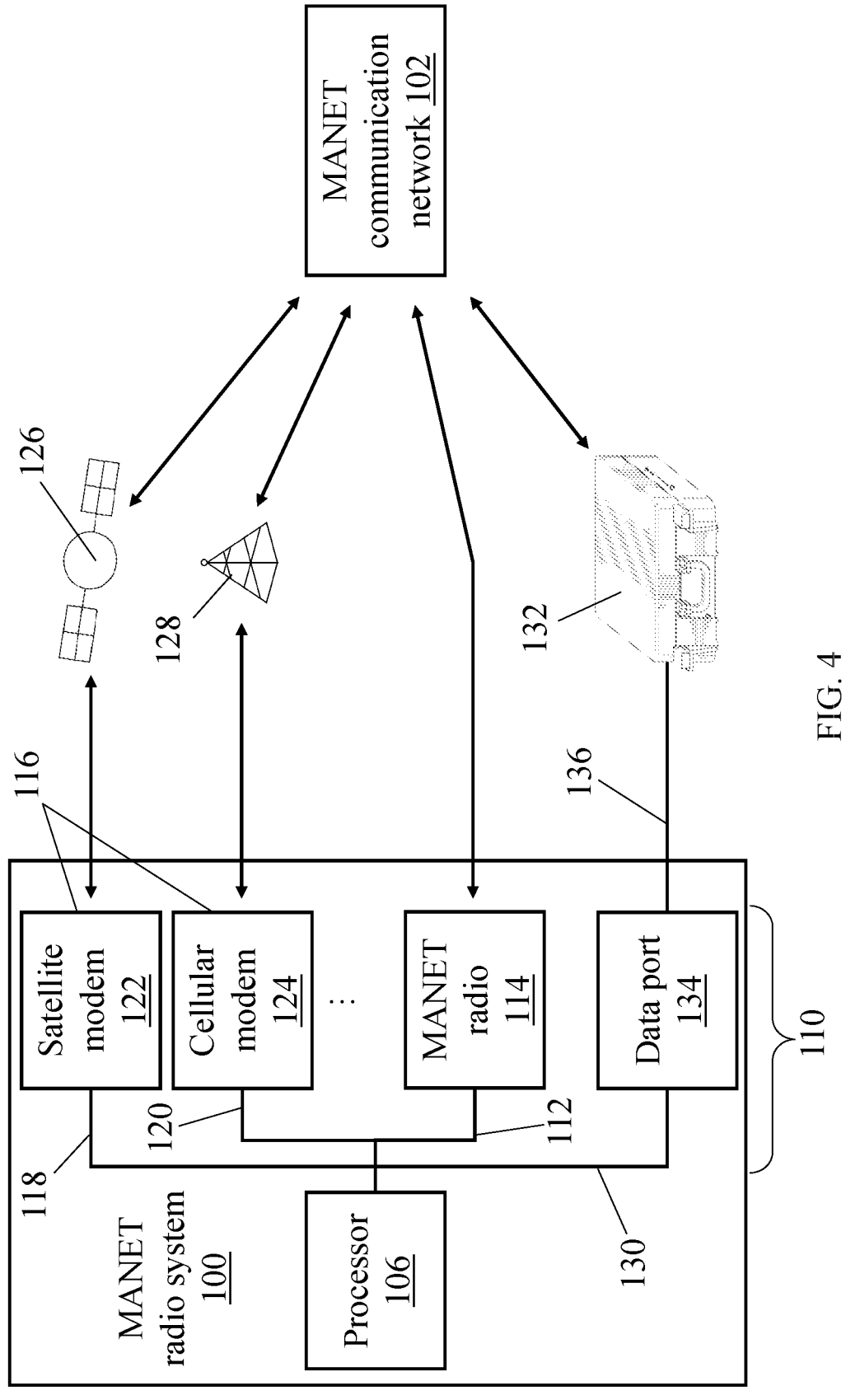
FIG. 4 is a schematic view of a MANET radio system.

The data received and transmitted by the processor 106 may be communicated through a plurality of communication modes 110, as shown in FIG. 4. A first communication mode 112 of the plurality of communication modes 110 is an internal communication mode that includes a MANET radio 114 housed within the body 104. The MANET radio 114 communicates directly with the MANET communication network 102. Thus, when the MANET radio system 100 communicates using the first communication mode 112, the MANET radio system 100 functions much as a typical MANET radio would. The plurality of communication modes 110 may also include at least two additional internal communication modes 116. The additional internal communication modes 116 supplement the communication abilities of the MANET radio system 100 by providing alternative methods of communication when the MANET radio loses connectivity. For example, if the MANET radio 114 loses line of sight with all other radios connected to the MANET communication network 102, the MANET radio 114 can no longer transmit or receive any data over the MANET communication network 102. With the additional internal communication modes 116, the MANET radio system 100 is left with alternative modes of communication.

The additional internal communication modes 116 may include a satellite communication mode 118 and a cellular communication mode 120. The satellite communication mode 118 involves a satellite modem 122 housed within the body 104. The satellite modem 122 is configured to enable satellite communication with the MANET communication network 102. Similarly, the cellular communication mode 120 involves a cellular modem 124 housed within the body 104. The cellular modem 124 is configured to enable cellular communication with the MANET communication network 102. Thus, in circumstances where the connection between the MANET radio system 100 and the satellite 126 or between the MANET radio system 100 and the cell tower 128 is stronger than the connection between the MANET radio system 100 and the MANET communication network 102, and especially when the connection between the MANET radio system 100 and the MANET communication network 102 is lost, the MANET radio system 100 is able to transmit and receive data through the satellite modem 122 and the satellite 126, or through the cellular modem 124 and the cell tower 128. Other MANET radio systems 100 that are connected to the MANET communication network 102 can likewise receive or transmit this data through the satellite modem 122 and the satellite 124 or through the cellular modem 124 and the cell tower 128, thus allowing the MANET radio system 100 to maintain a connection with the MANET communication network 102 even when the direct connection through the MANET radio 114 itself is lost.

Different embodiments of the MANET radio system 100 may include different combinations of internal communication modes 116 through which the processor 106 can communicate with the MANET communication network 102. For example, in addition to the first internal communication mode 112 with the MANET radio 114 described above, the MANET radio system 100 may be equipped with just the satellite communication mode 118, just the cellular communication mode 120, or both the satellite communication mode 118 and the cellular communication mode 120. The additional internal communication modes 116 may also include a Wi-Fi communication mode, a global positioning satellite (GPS) communication mode, an internet modem communication mode, a Bluetooth communication mode, and a voice over internet protocol (VOIP) communication mode, and any combination of these internal communication modes 116 may be implemented in any specific embodiment of the MANET radio system 100. One of ordinary skill in the art will understand the hardware and/or software needed to implement any of the various communication modes 116 within the MANET radio system 100 when provided with the present disclosure.

The plurality of communication modes 110 through which the processor 106 can communicate with the MANET communication network 102 may also comprise an external communication mode 130 that allows the MANET radio system 100 to communicate through an external device 132. The benefit of this is that the external device 132 may be equipped with additional modes of communication unavailable to the MANET radio system 100. When the MANET radio system 100 is connected to the external device 132, the MANET radio system 100 may therefore communicate using the additional modes of communication provided by the external device 132. The external communication mode 130 may involve at least one data port 134 positioned on the body 104 (see FIG. 3). The data port 134 is configured to communicatively engage with a data cord 136 to communicatively coupled the MANET radio system 100 with the external device 132 and any external communication system on the external device 132. As stated above, this enables the MANET radio system 100 to receive and transmit date through a communication network of the external device 132. The external device 132 may be any device that is capable of receiving and transmitting data. In some embodiments, the external device 132 is a mobile surveillance system as described in U.S. Pat. No. 11,457,182, entitled "Surveillance System for Mobile Surveillance Access to Remote Areas" to Higman that issued on Sep. 27, 2022, the contents of which is hereby incorporated herein by this reference.

As mentioned above, the MANET communication network 102 communicatively couples each of the MANET radio systems 100 to each other, and each MANET radio system 100 that is part of the MANET communication network 102 is configured to transmit and receive data to the other MANET radio systems 100. Each radio system 100 may be configured to verify a connection with each other radio system 100 in the MANET communication network 102. This verification may take place at varying rates. For example, the connection may be verified 25 times per second, 50 times per second, 100 times per second, etc. This allows each radio system 100 to be nearly constantly aware of which radio systems 100 are accessible through the MANET communication network 102, as well as through other communication modes. Each radio system 100 is also configured to designate a selected radio system 100 of the plurality of radio systems 100. The selected radio system 100 is the radio system 100 that is the target of the data to be transmitted. Each radio system 100 may also be configured to determine an optimal communication path from a plurality of communication paths to the selected radio system 100 through the MANET communication network 102. Thus, the radio system 100 may evaluate each potential communication path to the selected radio system 100, including passing through any number of intermediate radio systems 100, and select the optimal communication path for communicating the data. Thus, in some cases, the optimal communication path will be a direct connection between the sending radio system 100 and the target radio system 100. However, in cases where the sending radio system 100 and the target radio system 100 are not directly connected, the optimal communication path passes through an intermediate radio system 100. Therefore, the plurality of communication paths may include at least one communication path that passes through at least one intermediate radio system 100. Once the optimal communication path has been determined, the MANET radio system 100 may be configured to receive data from and transmit data to the selected radio system 100 over the optimal communication path.

In addition to the selection of an optimal communication path by the MANET radio system 100, the processor 106 may be configured to select an optimal communication mode from the plurality of communication modes 110, including the first internal communication mode 112, the additional internal communication modes 116, and/or the external communication mode 130. The optimal communication mode may be based on the strength and availability of each communication mode 110. Thus, when sending data, the processor 106 may recognize which communication modes 110 are not connected, which communication modes 110 have a weak connection, and which communication modes 110 have a strong connection. This, in combination with the ability of each MANET radio system 100 to determine the optimal communication path, allows each MANET radio system 100 to select the optimal communication mode for transmitting data to or receiving data from the MANET communication network 102, and then for routing that information to its target location over the optimal communication path. Depending on the communication mode 110 selected at each radio system 100, the data may exit and rejoin the MANET communication network 102 through the satellite 126, the cell tower 128, or some other external communication device as it travels over the optimal communication path.

The multiple potential communication paths for the data allows the MANET radio system 100 to maintain a connection with the MANET communication network 102, even when one of the potential communication paths fails due to a lost connection. For example, if the MANET radio system 100 lost line of sight of all other radios in the MANET communication network 102, rather than losing connection, the MANET radio system 100 is still capable of communicating by using a communication path that passes through the satellite 126, the cell tower 128, or some other external communication device.

The MANET radio system 100 may also be configured to work with other MANET radio systems 100 connected to the MANET communication network 102 to jointly complete a task. Because each MANET radio system 100 has a limited amount of processing power, the MANET communication network 102 may implement a parallel computing program to complete tasks that require more processing power than one MANET radio system 100 has. For example, the user may need to break an encryption code. Multiple MANET radio systems 100 connected to through the MANET communication network 102 may work together to break the code, thus accomplishing the task sooner due to the higher amount of processing power available. As another example, the user may need a computational problem solved, and multiple MANET radio systems 100 together may solve the problem faster and more efficiently. Multiple MANET radio systems 100 may also work together to analyze data. For example, the user may need to compare faces shown in a set of video data with known faces in a database to determine if a specific individual can be identified in the video data. This facial recognition process can be performed by multiple MANET radio systems 100 working together over the MANET communication network 102 to analyze the data and provide an answer to the user more quickly. Other tasks involving parallel computing and quantum computing on the edge may also be performed.

It is contemplated that the MANET radio system 100 and the MANET communication network can be secured by implementing multi-layer encryption to the communication. In some embodiments, this may involve three- or more-layer encryption. In other embodiments, continuous encryption may be implemented as well. For example, in a multi-layer encryption MANET network, if one of the radio systems 100 becomes compromised, as noted by the radio system 100 not responding or acting outside of set parameters, the other radio systems 100 within the MANET network can automatically shift to a new layer of encryption at the exclusion of the compromised system 100 so that the MANET communication network 102 can continue to be used by the uncompromised systems 100 without worrying about compromised security or allowing unauthorized access to secure communications.

It is also contemplated that a voice queue may be implemented in delivering messages to a specific radio system 100. Typically, radios function with a "push-to-talk" feature where, when the user pushes the talk button, then the user is able to broadcast a message, but is unable to hear any incoming messages at the same time. The talk button must be released for any messages to come through, and any messages that came while the talk button was pressed are lost. The voice queue allows a message to send, and then holds the message in a buffer until the receiver is ready to receive the message. For example, if the receiver is currently sending a message, then the voice queue holds the incoming message until the receiver is done talking, at which point the voice queue delivers the message to the receiver. In this way, users of the radio system 100 do not miss any messages.

It will be understood that implementations of a MANET radio system are not limited to the specific assemblies, devices and components disclosed in this document, as virtually any assemblies, devices and components consistent with the intended operation of a MANET radio system may be used. Accordingly, for example, although particular MANET radio systems, and other assemblies, devices and components are disclosed, such may include any shape, size, style, type, model, version, class, measurement, concentration, material, weight, quantity, and/or the like consistent with the intended operation of MANET radio systems. Implementations are not limited to uses of any specific assemblies, devices and components; provided that the assemblies, devices and components selected are consistent with the intended operation of a MANET radio system.

Accordingly, the components defining any MANET radio system may be formed of any of many different types of materials or combinations thereof that can readily be formed into shaped objects provided that the materials selected are consistent with the intended operation of a MANET radio system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various MANET radio systems may be manufactured using conventional procedures as added to and improved upon through the procedures described here. Some components defining a MANET radio system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g.

a bolt, a nut, a screw, a nail, a rivet, a pin, and/or the like), wiring, any combination thereof, and/or the like for example, depending on, among other considerations, the particular material forming the components.

It will be understood that methods for manufacturing or assembling MANET radio systems are not limited to the specific order of steps as disclosed in this document. Any steps or sequence of steps of the assembly of a MANET radio system indicated herein are given as examples of possible steps or sequence of steps and not as limitations, since various assembly processes and sequences of steps may be used to assemble MANET radio systems.

The implementations of a MANET radio system described are by way of example or explanation and not by way of limitation. Rather, any description relating to the foregoing is for the exemplary purposes of this disclosure, and implementations may also be used with similar results for a variety of other applications employing a MANET radio system.

What is claimed is:

1. A mobile ad hoc network (MANET) communication network, comprising:

a plurality of MANET radio systems in communication with each other via the MANET communication network, each MANET radio system comprising:

a body comprising a housing and a display; and a processor, housed within the body and configured to receive data from and transmit data to each other MANET radio system of the MANET communication network;

a MANET radio housed within the body and configured to communicate directly with the MANET communication network;

a satellite modem housed within the body and configured to enable satellite communication with the MANET communication network;

a cellular modem housed within the body and configured to enable cellular communication with the MANET communication network; and at least one data port configured to communicatively engage with a data cord to communicatively couple with an external communication system and enable the MANET radio system to receive and transmit the data through a communication network of the external communication system;

wherein the processor is configured to:

select, as a communication mode from a plurality of communication modes for receiving the data from and transmitting the data to each other MANET radio system of the MANET communication network, between one of:

a first internal communication mode via the MANET radio;

a second internal communication mode via the satellite modem;

a third internal communication mode via the cellular modem; or a first external communication mode via the at least one data port;

verify a connection with each other MANET radio system of the plurality of MANET radio systems in the MANET communication network at least 50 times per second;

designate a selected MANET radio system of the plurality of MANET radio systems;

determine a communication path, from a plurality of communication paths, to the selected MANET radio system through the MANET communication network, wherein the determined communication path passes through at least one intermediate MANET radio system of the plurality of MANET radio systems or the determined communication path is a direct connection to the selected MANET radio system; and receive the data from and transmit the data to the selected MANET radio system of the plurality of MANET radio systems over the selected communication path of the MANET communication network using the selected communication mode; and wherein the processor is configured to select the communication mode based on a connection strength and an availability of each communication mode.

2. The MANET radio system of claim 1, wherein the MANET radio system is capable of maintaining a connection with the MANET communication network regardless of a location of the MANET radio system with respect to the MANET communication network.

3. The MANET radio system of claim 1, wherein the processor is configured to select between additional communication modes comprising a Wi-Fi communication mode, a global positioning satellite (GPS) communication mode, an internet modem communication mode, a Bluetooth communication mode, and a voice over internet protocol (VOIP) communication mode.

4. The MANET radio system of claim 1, wherein the body has display is a touchscreen display configured to provide controls to a user of the MANET radio system and display data received from the MANET communication network to the user.

5. The MANET radio system of claim 1, wherein the MANET radio system is configured to display a location of other MANET radio systems connected to the MANET communication network to a user.

6. The MANET radio system of claim 1, wherein the MANET radio system is configured to work with other MANET radio systems connected to the MANET communication network to jointly complete a task.

7. The MANET radio system of claim 6, wherein the task is one of solving a computational problem, analyzing data, and breaking an encryption code.

8. A mobile ad hoc network (MANET) communication network, comprising:

a plurality of MANET radio systems in communication with each other via the MANET communication network, each MANET radio system comprising:

a body comprising a housing and a display; and a processor, housed within the body and configured to receive data from and transmit data to each other MANET radio system of the MANET communication network;

a MANET radio housed within the body and configured to communicate directly with the MANET communication network; and at least one of a satellite modem housed within the body and configured to enable satellite communication with the MANET communication network and a cellular modem housed within the body and configured to enable cellular communication with the MANET communication network;

wherein the processor is configured to:

select, as a communication mode from a plurality of communication modes for receiving the data from and transmitting the data to each other MANET radio system of the MANET communication network, between one of:

a first internal communication mode via the MANET radio; and at least one of a second internal communication mode via the satellite modem or a third internal communication mode via the cellular modem;

designate a selected MANET radio system of the plurality of radio systems;

determine a communication path, from a plurality of communication paths, to the selected radio system through the MANET communication network, wherein at least one of the plurality of communication paths passes through at least one intermediate radio system of the plurality of MANET radio systems; and receive the data from and transmit the data to the selected MANET radio system of the plurality of MANET radio systems over the selected communication path, wherein the processor is configured to select the communication mode based on a connection strength and an availability of each communication mode.

9. The MANET radio system of claim 8, further comprising an external communication mode having at least one data port configured to communicatively engage with a data cord to communicatively couple with an external communication system and enable the MANET radio system to receive and transmit data through a communication network of the external communication system, wherein the plurality of communication modes, from which the processor selects, further comprises a first external communication mode via the at least one data port and the processor is further configured to select the communication mode from the first internal communication mode, the at least one of the second internal communication mode, the third internal communication mode or the external communication mode.

10. The MANET radio system of claim 8, wherein each radio system in the MANET communication network is configured to verify a connection with each other radio system of the plurality of radio systems in the MANET communication network at least 50 times per second.

11. The MANET radio system of claim 8, wherein the MANET radio system is configured to work with other MANET radio systems connected to the MANET communication network to jointly complete a task.

12. The MANET radio system of claim 11, wherein the task is one of solving a computational problem, analyzing data, and breaking an encryption code.

13. A mobile ad hoc network (MANET) radio system of a MANET communication network, the MANET radio system comprising:

a body; and a processor, housed within the body and configured to receive data from and transmit data to each of a plurality of other MANET radio systems of the MANET communication network; modes comprising:

a MANET radio housed within the body and configured to communicate directly with the MANET communication network; and at least one of a satellite modem housed within the body and configured to enable satellite communication with the MANET communication network and a cellular modem housed within the body and configured to enable cellular communication with the MANET communication network;

wherein processor is configured to:

select, as a communication mode from a plurality of communication modes for receiving the data from and transmitting the data to each of the plurality of other MANET radio systems of the MANET communication network, between one of:

a first internal communication mode via the MANET radio; and at least one of a second internal communication mode via the satellite modem or a third internal communication mode via the cellular modem;

designate a selected MANET radio system of the plurality of radio systems;

determine a communication path, from a plurality of communication paths, to the selected radio system through the MANET communication network, wherein at least one of the plurality of communication paths passes through at least one intermediate radio system of the plurality of MANET radio systems; and receive the data from and transmit the data to the selected MANET radio system of the plurality of radio systems over the selected communication path; and wherein the processor is configured to select the communication mode based on a connection strength and an availability of each communication mode.

14. The MANET radio system of claim 13 further comprising at least one data port configured to communicatively engage with a data cord to communicatively couple with an external communication system and enable the MANET radio system to receive and transmit data through a communication network of the external communication system, wherein the plurality of communication modes, from which the processor selects, further comprises a first external communication mode via the at least one data port and the processor is further configured to select the communication mode from the first internal communication mode, the at least one of the second internal communication mode, the third internal communication mode or the external communication mode.

15. The MANET radio system of claim 13, wherein the body has a comprises a touchscreen display configured to provide controls to a user of the MANET radio system and display data received from the MANET communication network to the user.

16. The MANET radio system of claim 13, wherein each radio system in the MANET communication network is configured to verify a connection with each other radio system of the plurality of radio systems in the MANET communication network at least 50 times per second.

17. The MANET radio system of claim 13, wherein the MANET radio system is configured to work with other MANET radio systems connected to the MANET communication network to jointly complete a task.

18. The MANET radio system of claim 17, wherein the task is one of solving a computational problem, analyzing data, and breaking an encryption code.

* * * * *